US008112813B1

(12) United States Patent
Goodwin et al.

(10) Patent No.: US 8,112,813 B1
(45) Date of Patent: Feb. 7, 2012

(54) INTERACTIVE IMAGE-BASED DOCUMENT FOR SECURED DATA ACCESS

(75) Inventors: Robert L Goodwin, Mercer Island, WA (US); David Zhao, Bothell, WA (US); Adrian Tsang Kwong Chan, Bellevue, WA (US); Chieh Wang, Issaquah, WA (US); Michael V Rykov, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1288 days.

(21) Appl. No.: 11/540,764

(22) Filed: Sep. 29, 2006

(51) Int. Cl.
*G06F 7/04* (2006.01)

(52) U.S. Cl. ......................................... 726/27

(58) Field of Classification Search .................. 713/168; 380/277–279, 282; 715/156, 164–168; 726/21, 726/26, 27, 7, 28
See application file for complete search history.

(56) References Cited

U.S. PATENT DOCUMENTS

| | | | | |
|---|---|---|---|---|
| 5,619,708 | A * | 4/1997 | Ho | 715/224 |
| 6,047,309 | A | 4/2000 | Dan et al. | |
| 6,202,158 | B1 | 3/2001 | Urano et al. | |
| 6,321,264 | B1 | 11/2001 | Fletcher et al. | |
| 6,574,609 | B1 * | 6/2003 | Downs et al. | 705/50 |
| 6,704,733 | B2 * | 3/2004 | Clark et al. | 715/209 |
| 7,298,851 | B1 * | 11/2007 | Hendricks et al. | 713/165 |
| 7,437,438 | B2 | 10/2008 | Mogul et al. | |
| 7,506,246 | B2 * | 3/2009 | Hollander et al. | 715/230 |
| 2002/0099818 | A1 | 7/2002 | Russell et al. | |
| 2003/0229695 | A1 | 12/2003 | McBride | |
| 2004/0024688 | A1 | 2/2004 | Bi et al. | |
| 2004/0030898 | A1 | 2/2004 | Tsuria et al. | |
| 2004/0103305 | A1 * | 5/2004 | Ginter et al. | 713/200 |
| 2005/0102352 | A1 | 5/2005 | Zhang et al. | |
| 2006/0037075 | A1 | 2/2006 | Frattura et al. | |
| 2006/0068769 | A1 | 3/2006 | Adya et al. | |
| 2006/0153089 | A1 | 7/2006 | Silverman | |
| 2006/0272031 | A1 | 11/2006 | Ache et al. | |
| 2007/0026371 | A1 * | 2/2007 | Wood | 434/317 |
| 2007/0061447 | A1 | 3/2007 | Flores et al. | |
| 2008/0022003 | A1 | 1/2008 | Alve | |
| 2008/0052394 | A1 | 2/2008 | Bugenhagen et al. | |
| 2008/0104231 | A1 | 5/2008 | Dey et al. | |
| 2008/0282091 | A1 | 11/2008 | Ashok et al. | |
| 2009/0037578 | A1 | 2/2009 | Hattori et al. | |

OTHER PUBLICATIONS

Roberts, Who Goes There? Building Smarter Authentication, InfoWorld, Jul. 24, 2006, Issue 30, pp. 26-30 and 32.

* cited by examiner

*Primary Examiner* — Ellen Tran
(74) *Attorney, Agent, or Firm* — Knobbe, Martens, Olson & Bear LLP

(57) ABSTRACT

The present invention is directed to a method and system for verifying a user for copying or printing a limited portion of digital content while allowing the user to view the digital content. The digital content may have image portions that are digital images generally scanned from a printed page of the content and text portions that are digital texts including all forms of letters, characters, symbols, etc. An interactive image document displaying image portions of the digital content is provided for secure data access to text portions. A user can request and obtain a limited text portion of the digital content or view the image portions of the digital content via user interactions within the interactive image document. While the text portions can be reproduced, copied, or printed, the image portions can not be re-used or manipulated by the user due to their non-text accessible format.

32 Claims, 13 Drawing Sheets

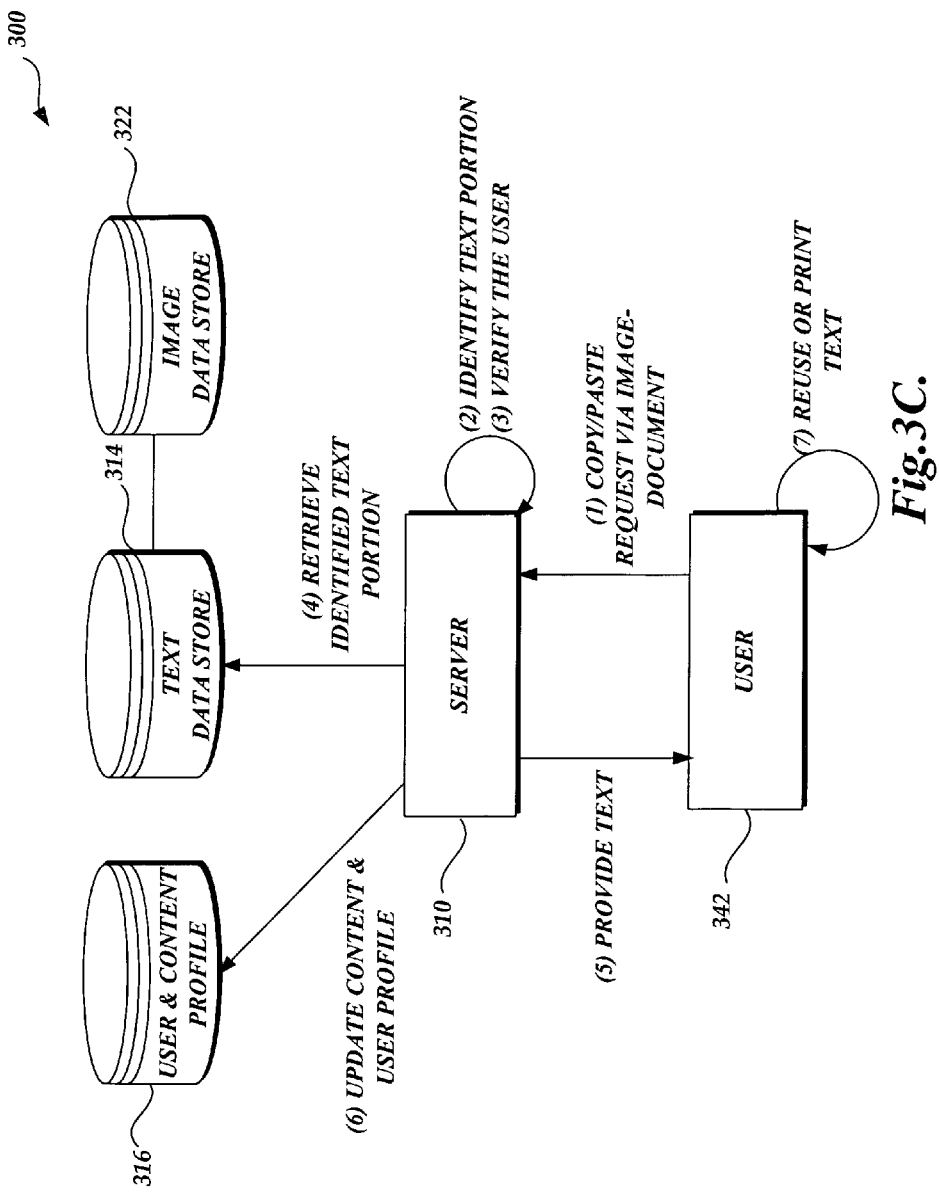

INTERACTIVE IMAGE-BASED DOCUMENT FOR SECURED DATA ACCESS

BACKGROUND

As the use of computers and computer-based networks continues to expand, content providers are preparing and distributing more and more content in electronic form. This content includes traditional media such as books, magazines, newspapers, newsletters, manuals, guides, references, articles, reports, documents, etc., that exist in print as well as electronic media in which the aforesaid content exists in digital form or is transformed from print into digital form. The Internet, in particular, has facilitated the wider publication of digital content, such as portable document files and e-books, through downloading and display of images of digital content. As data transmission speeds increase, more and more images of pages of digital content are becoming available online. Generally, a page image containing representation of text allows a reader to see the page of content as it would appear in print.

Content in a certain digital form, such as images containing digital text, may be easily reproduced, copied, or distributed once a person gains access to the content. Given the easy reproduction capability of the digital content, one of the major concerns shared by content authors or publishers may be how to prevent unauthorized copying or printing of the content in a digital form while allowing people to view (read) the content over a network. Thus, it is not uncommon that a content author or a publisher wishes to only allow readers to view the digital content, but prevent them from copying or printing any portion of the digital content. However, a reader who purchased a right to read the content in a digital form wants to have fair use of the content as if the reader purchased the content in a print form. For example, when a reader wants to quote a paragraph from the recently purchased electronic publication into his/her report, the reader may want to "copy and paste" the paragraph from the electronic publication instead of typing it.

Currently, most content providers face problems due to these different points of view of the readers and the publishers. One major issue is how to prevent illegitimate use of the digital content (to satisfy content originators or publishers) while allowing the legitimate printing or copying of some portions of the content by readers. If readers are too restricted from printing or copying portions of digital content, they may be discouraged to purchase the digital content of electronic publications. On the other hand, the publisher or the content originator may be deterred from offering content in digital form if there is no secure way to prevent excessive copying and printing that can eventually lead to the illegitimate use of the content. Accordingly, there is a need for system and method that resolves the different points of view of the readers and the publishers with respect to the use of the digital content.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present invention, a computer system for providing an interactive image document through which a user accesses text data of digital content is provided. The computer system includes one or more data stores such as a text data store for storing text portions of the digital content, an image data store for storing image portions of the digital content, and a user and content profile data store for storing verification information. The computer system further includes a computing device in communication with the one or more data store(s).

The computing device is operative to receive a user request to access a portion of the digital content, process the request to retrieve the portion of the digital content and present an interactive image page to the user. When the user interaction indicating that a text portion access is desired is received, the computing device obtains from the user and content profile data store verification information related to the text portion access. The text portion corresponding to the user interaction is identified. The user is verified whether the user has a right to access the text portion by applying the obtained verification information. Upon verification, the computing device retrieves the text portion from the text data store and provides the retrieved text portion to the user.

In an aspect of the method, the verification information may include several thresholds for several users' activities. For example, a total access amount of the digital content, a total access amount of a particular text portion, etc., and the corresponding thresholds may be included in the verification information. The computing device compares the total access amount of the text portion and a content threshold and if the total access amount of the text portion exceeds the content threshold, the computing device denies the verification. If the verification is denied, the computing device generates a user notification.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A-3C are pictorial diagrams showing interactions among various components in the content provider server when a user accesses digital images in accordance with an embodiment of the present invention;

DETAILED DESCRIPTION

Figure 1:
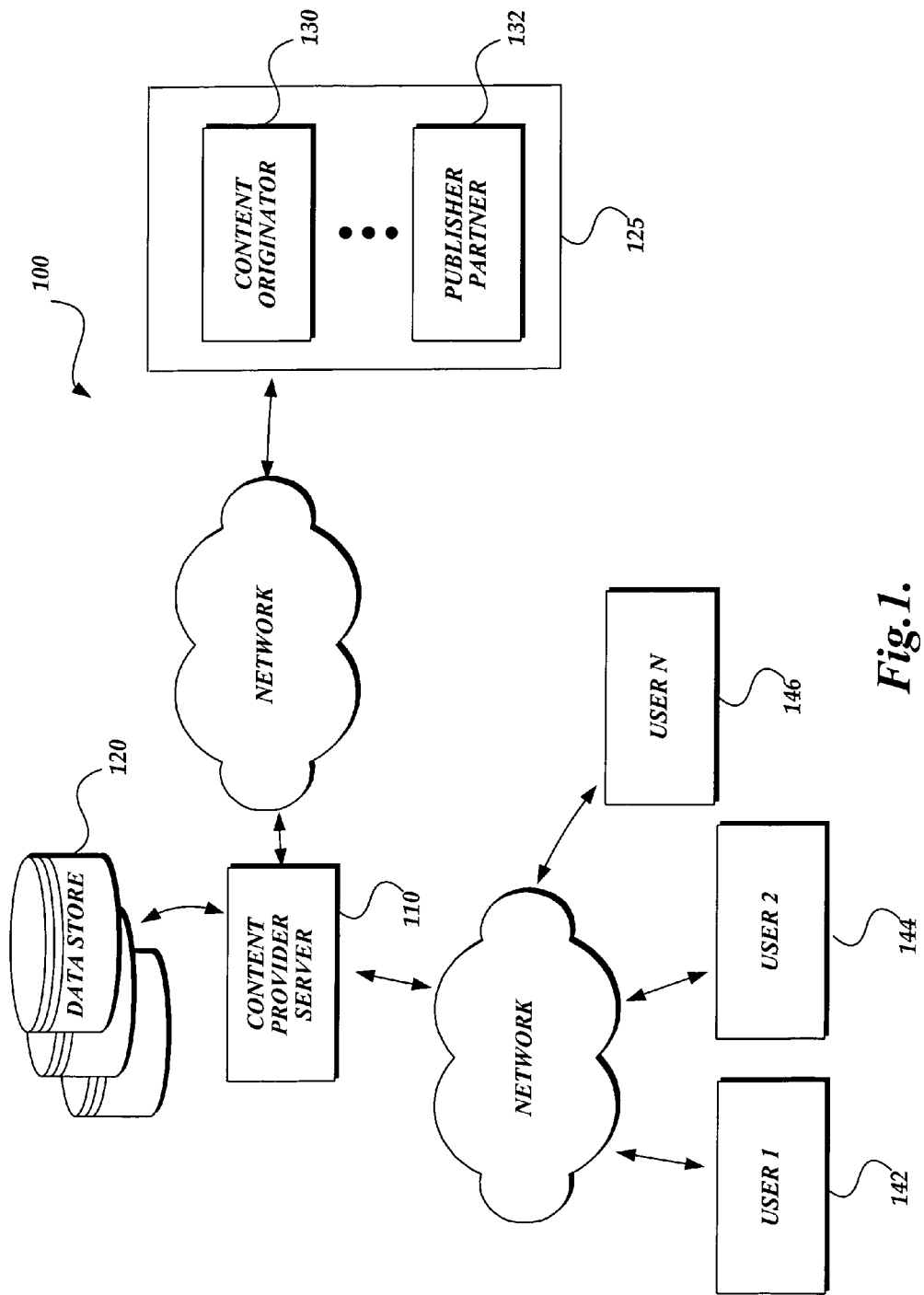
FIG. 1 is a pictorial diagram showing an exemplary computing environment in which embodiments of the present invention may be implemented.

Generally described, the present invention relates to a method and system for verifying a user's right for copying, pasting, or printing some portion of digital content. More specifically, the present invention relates to a method and system for providing an interactive image document displaying images of digital content for secure data access to text data over a network. Through the interactive image document, a user can obtain a limited portion of digital content for copying or printing after the content service provider verifies the user's access rights to the portion. Additionally, the present invention may relate to separation of a "text portion" and an "image portion" of the digital content. The "text portion," as used herein refers to digital text including all forms of letters, characters, symbols, numbers, formulas, graphics, images, etc., that may be used to represent information in the corresponding image portion. The "image portion," as used herein refers to a digital image of information. For example, the image portion may be scanned from a printed page of content. Generally the image portion is represented in a non-text-accessible format. The image portion is utilized for the user to view (read) the digital content within the interactive image document. While the text portion can be reproduced, copied, or printed after a proper verification, the image portion cannot be re-used or manipulated by the user.

The following detailed description describes exemplary embodiments of the invention. Although specific system configurations, screen displays, and flow diagrams are illustrated, it should be understood that the examples provided are not exhaustive and do not limit the present invention to the precise forms and embodiments disclosed. It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. However, it will be apparent to one skilled in the art that the invention may be practiced without some or all of these specific details. In other instances, well-known process steps have not been described in detail in order not to obscure the invention.

The exemplary networked environment 100 includes one or more user devices, such as user devices 142-146, by which a user (not shown) can view digital content over a network. The user devices 142-146 communicate with a content provider server 110 that is responsible for providing images of digital content (image pages) to user devices 142-146 via a network. User devices, such as user devices 142-146, are typically computing devices including a variety of configurations or forms such as, but not limited to, laptop or tablet computers, personal computers, personal digital assistants (PDAs), hybrid PDA/mobile phones, mobile phones, workstations, and the like. While illustrative embodiments have been illustrated and described, it will be appreciated that various changes can be made therein without departing from the spirit and scope of the invention. In one embodiment, the user devices 142-146 can be also connected to a content provider server 110 via a communication network, such as a Local Area Network (LAN) or a Wide Area Network (WAN). In an alternative embodiment, any user device 142-146 can be a standalone user device that is configured to implement off-line services. The content provider server 110 is coupled to data stores 120, including a text data store and an image data store, each of which includes an entry corresponding to a digital content. As will be appreciated by one of ordinary skill in the art, digital content includes images of any content in digital form, such as but not limited to, e-books, electronically published news, electronically published magazines, or the like. A data store, such as the content data store as used herein, is any type, form, and structure of storage in which data is maintained. For example, the data store may maintain data in a database form, such as a relational database, or as images. Any form, type, and structure may be used for maintaining electronic content/information in accordance with one or more embodiments of the present invention.

As illustrated in FIG. 1, the content provider server 110 may be connected to online data stores over a communication network such as an internal network or public network connection. Further, as shown in FIG. 1, the content provider server 110 may be connected to several content related servers 125, including, but not limited to, content originators 130, publisher partners 132, etc. The publisher partners 132 or content originators 130 may provide content to the content provider server 110 which will convert the received content into image portions and text portions suitable for the data stores 120. Those skilled in the art will appreciate that the various servers/components depicted in FIG. 1 are illustrative only. As mentioned above, an actual embodiment of a content provider server 110 may be comprised of a single computer or a plurality of discrete, cooperative servers distributed in a communications network. Similarly, the identified components should be viewed as logical components as each component may be physically embodied on one or more computer systems as well as combined with other hardware and/or software components not illustrated herein.

Figure 2:
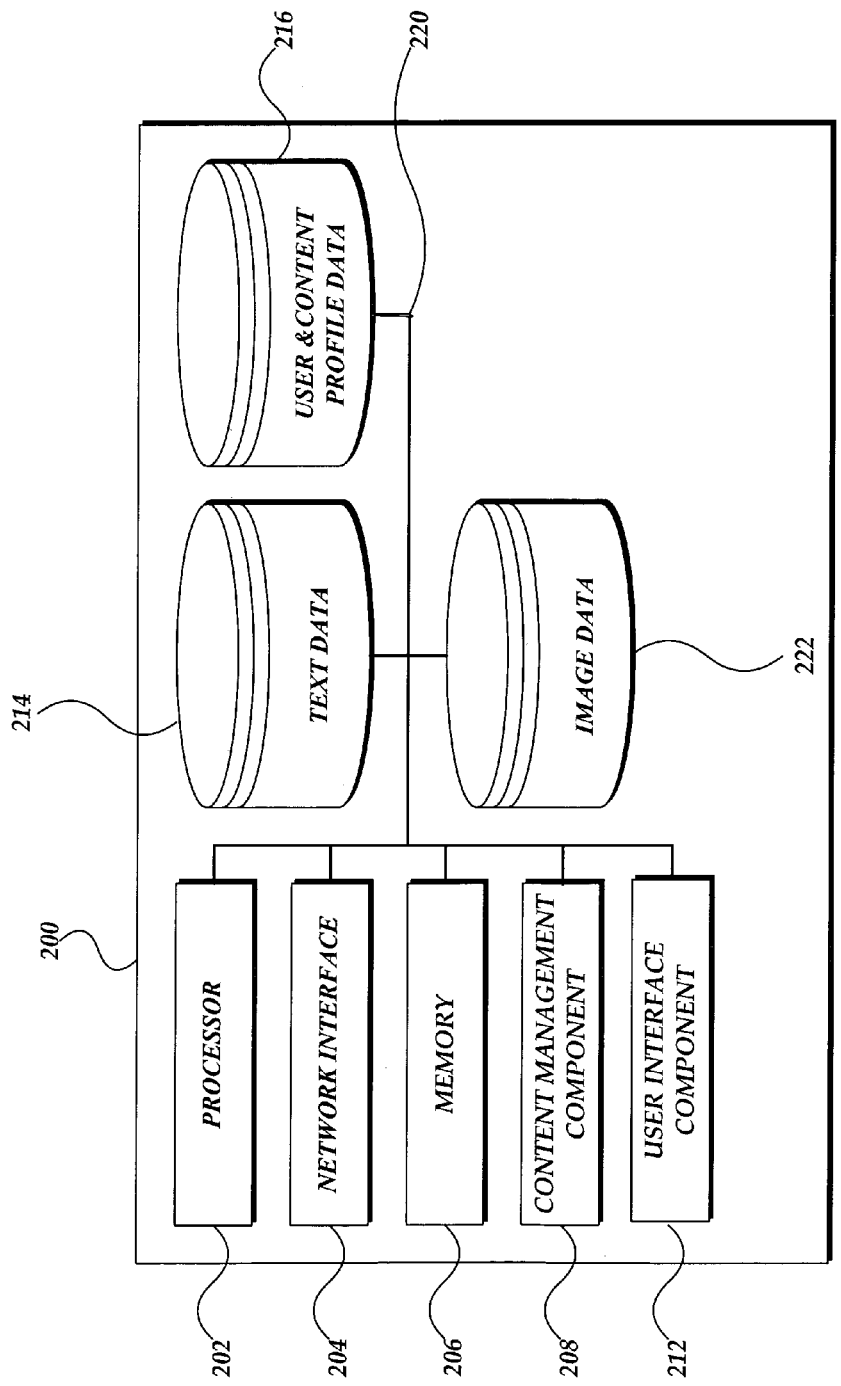
FIG. 2 is a block diagram of a content provider server in accordance with an embodiment of the present invention.

FIG. 2 is a block diagram illustrating exemplary components of a computing device 200 suitable for providing a text portion of a digital content in response to a user selection. However, the following description of the exemplary components of a computing device 200 should be viewed as illustrative only and not construed as limiting in any manner.

With regard to FIG. 2, the exemplary computing device 200 includes a processor 202 in communication with a variety of other components over a system bus 220. These other components include, by way of example, a network interface 204, a user interface component 212, a content management component 208, and a memory 206. As appreciated by those skilled in the art, the network interface 204 enables the computing device 200 to communicate data, control signals, data requests, and other information with other resources including computers, data sources, storage devices, and the like, on a computer network such as the Internet (not shown). The network interface 204 may be configured to communicate via wired or wireless connections. As one skilled in the art will appreciate, the computing device 200 may retrieve a digital image from a storage device or other source via the computer network, as well as save the processed converted content to a networked location or send it to another computer on the network.

The computing device 200 further includes one or more data stores such as a text data store 214 for storing text portions of the digital content and an image data store 222 for storing image portions of the digital content. The image data store 214 provides images (image portions) represented in a non-text-accessible format, such as in a JPEG, TIFF, GIF, and BMP file. The text data store 214 provides digital text data (text portions) including all forms of letters, characters, symbols, numbers, formulas, graphics, etc., that may be used to represent information in the corresponding image.

In one embodiment, the computing device 200 may receive electronic images (e.g., images page) containing text from the publisher partners or content originators. The computing device 200 separates the text portion from the received electronic images, the resulting image portion to be represented in a non-text-accessible format, such as in a JPEG, TIFF, GIF, and BMP file. Alternatively, content in print form may be received and scanned into image pages using a suitable scanner input device. The scanned image pages may be created to be an image portion represented in a non-text accessible format. The text portion may be generated from the content in print form. In one embodiment, the image portions and the text portions are separately stored in the image data store 222 and the text data store 214, respectively. The image data store 222 may be organized as desired, preferably using data structures optimized for identifying the corresponding text portion from the text data store 214. In one suitable embodiment, each word in the text data store 214 has associated therewith content identification numbers and page numbers corresponding to an image portion in the image data store 222 where the particular word is found.

The computing device 200 further includes a user and content profile data store 216 for storing verification information. The user and content profile data store 216 enables the content provider server 110 to control the scope and nature of the content (image portion or text portion) that can be displayed or presented to the user. The user and content profile data store 216 may include information about the user, for example, user profile information, account information, content purchase history, illegitimate use history, etc. A user may be permitted to view an entire image of content, such as a book, that the user already purchased. For content not purchased by the user, the user may be permitted to view only a limited portion of the page image or prohibited from viewing any portion of the content. Other information, such as information about content, including, but not limited to, content profile, several thresholds associated with the content, verification information, or the like, may be also included in the user and content profile data store 216.

The user interface component 212 receives user interaction via an interactive image document displayed on the user devices 142-146. The user interaction may be received from a variety of input devices including, but not limited to, a digital pen, a touch screen, a keyboard, a mouse, and the like. In addition to the exemplary components described above, a content management component 208 may be used for verifying the user interaction and identifying a text portion in response to the user interaction. The content management component 208 may first identify an image portion from the image data store and then identify the corresponding text portion.

Figure 3A:
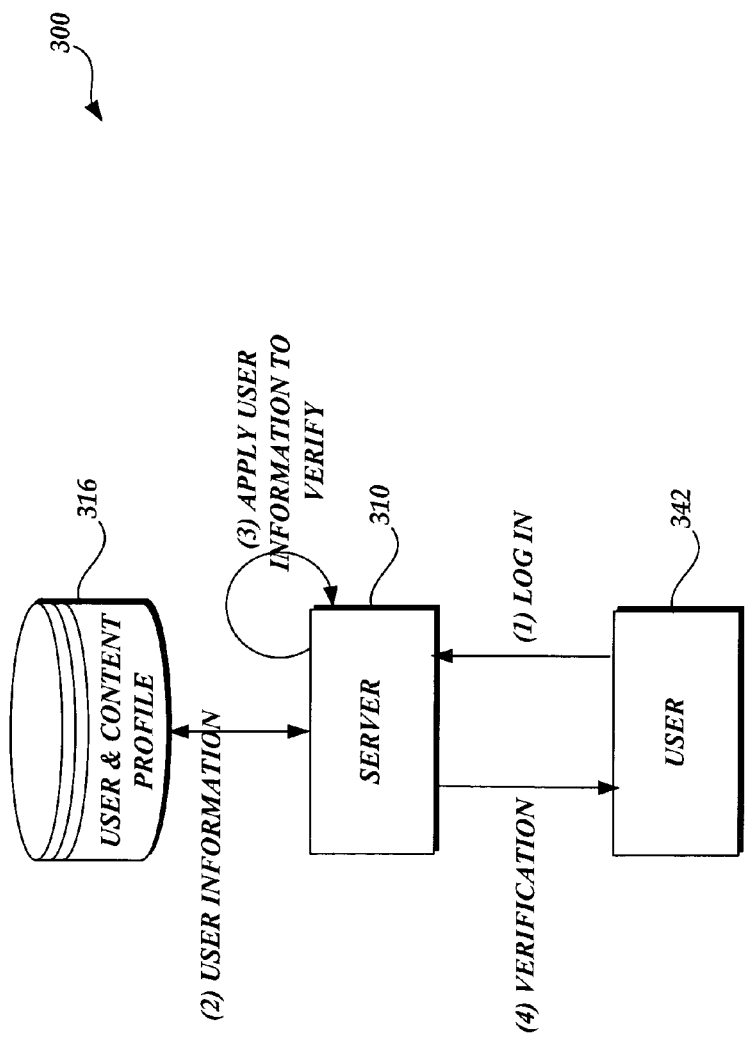
Figure 3B:
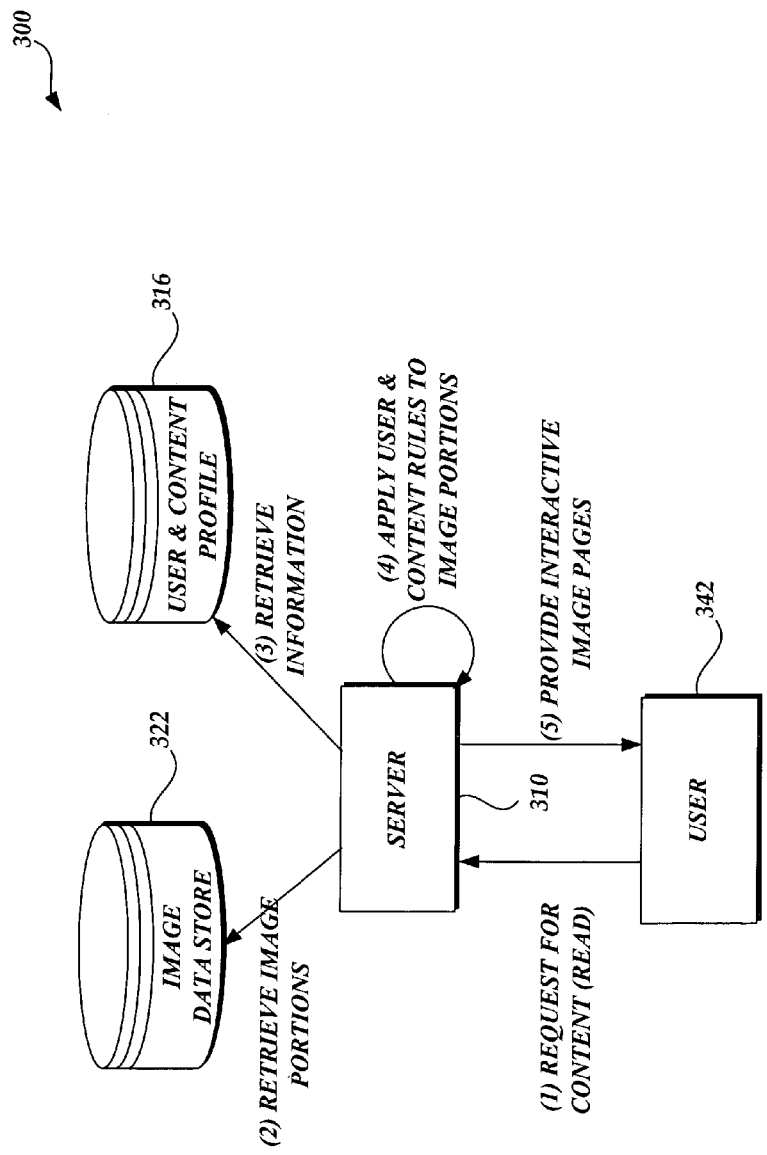

The processor 202 is configured to operate in accordance with programming instructions stored in a memory (not shown). The memory generally comprises RAM, ROM, and/or other permanent memory. Thus, in addition to storage in read/write memory (RAM), programming instructions may also be embodied in read-only format, such as those found in ROM or other permanent memory. The memory typically stores an operating system for controlling the general operation of the computing device 200. The operating system may be a general purpose operating system such as a Microsoft Windows® operating system, a UNIX® operating system, a Linux® operating system, or an operating system specifically written for and tailored to the computing device 200. Similarly, the memory also typically stores user-executable applications or programs for conducting various functions on the computing device 200. FIGS. 3A-3C are pictorial diagrams illustrating interactions among various components in the content provider server and a user device when a user accesses digital images over a network. Referring to FIGS. 3A, a user 342 requests login access to a server 310 (e.g., content provider server) configured to provide secure access to text data over a network. In response to the request, the server 310 retrieves information about the user, for example, user profile information, account information, content purchase history, illegitimate use history, etc., from the user and content profile data store 316. The user 342 information may be applied to verify the user 342 to access various content services provided by the server 310. For example, the server may not allow a user to access a certain digital content if the user has not purchased a right to read, if the user has a history of illegitimate use of the digital content, or the like. After applying the user information to the user 342, the server 310 determines (verifies) a set of content services which the user 342 has a right to access.

Referring to FIG. 3B, after the user 342 requests to access image pages of digital content, the server 310 identifies and retrieves image portions of the digital content from the image data store 322. In one embodiment, the server 310 may verify the user's request before providing the image portions by checking the previously determined set of content services which the user 342 has a right to access. Further, as will be described in greater detail below, the content profile information relating to the requested digital content may be utilized to verify whether the content can be accessed by the user 342. In one embodiment, several thresholds may be specified with respect to a user, a digital content, a portion of a digital content, or the like. Each threshold will be used to verify a user's access request. After verification, the server will provide an appropriate image portion (interactive image page) through which the user 342 can view the digital content or select a portion of the digital content for requesting corresponding digital text. In an alternative embodiment, the server 310 may identify text portions of the digital content and after verification, generate an interactive image page corresponding to the text portions on the fly.

In an illustrative embodiment, the content profile information indicates that no user can access the particular digital content due to suspicious activities of a group of users. In an illustrative embodiment, the content profile information may include a content threshold associated with a digital content, which is used to limit a total value of "aggregated access" on the digital content. The total value of "aggregated access" used herein refers to a quantified amount of digital content being copied, pasted, or printed by users within a predetermined period. In the illustrative embodiment, the total percentage of digital content accessed by users may be aggregated to monitor group behaviors of users. For example, if a particular e-book has been accessed by five users for a week and each user copied. 10%, 25%, 25%, 10%, and 10% of image pages of the e-book, the total value of aggregated access to the e-book may be 80%. For another example, if a particular image page of the e-book has been accessed by three users for a week and each user copied 1%, 15%, and 5% of the image page of the e-book, the total value of aggregated access to the image page may be 21%. Based on the previous knowledge, the server defines a threshold for a particular type of access, such as a total value of aggregated access, to prevent unauthorized group behavior by users. In this manner, the server can monitor potential illegitimate use of the digital content not only by a single user but also by a group of users.

In one embodiment, the server may monitor whether the total value of aggregated access to the digital content meets its threshold. Once the total value of aggregated access meets the threshold, the server will apply a set of rules, for example not allowing any user to copy or print the digital content for a predetermined period. The result may be stored as part of content profile information associated with the digital content. It is to be understood that this implementation of aggregated access value is just one example. Various user access behaviors will be monitored and the information related to accessing a digital content may be collected and analyzed to prevent unauthorized group or individual behaviors.

Figure 5A:
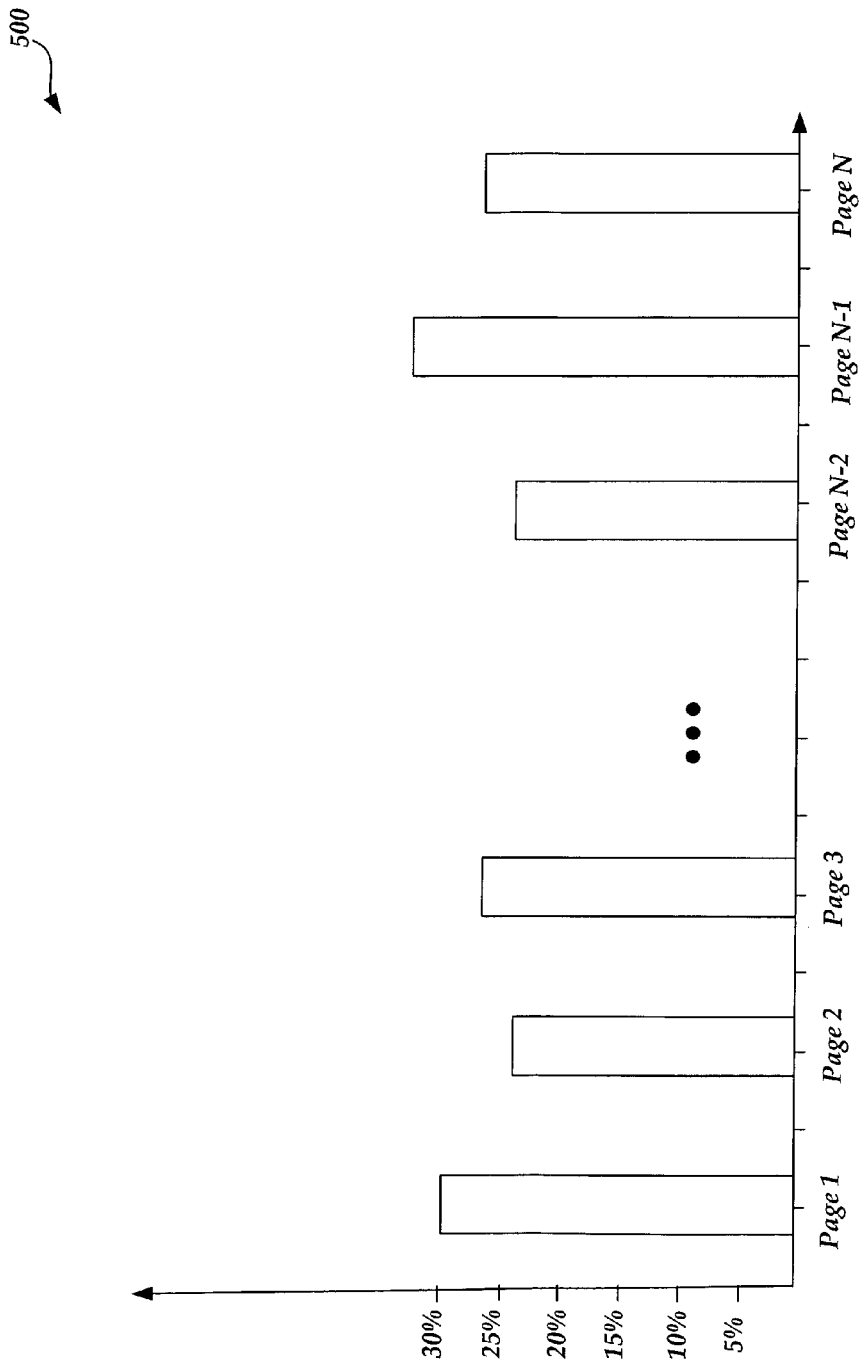
FIGS. 5A-5B are pictorial graphs showing digital content access patterns among various users.
Figure 5B:
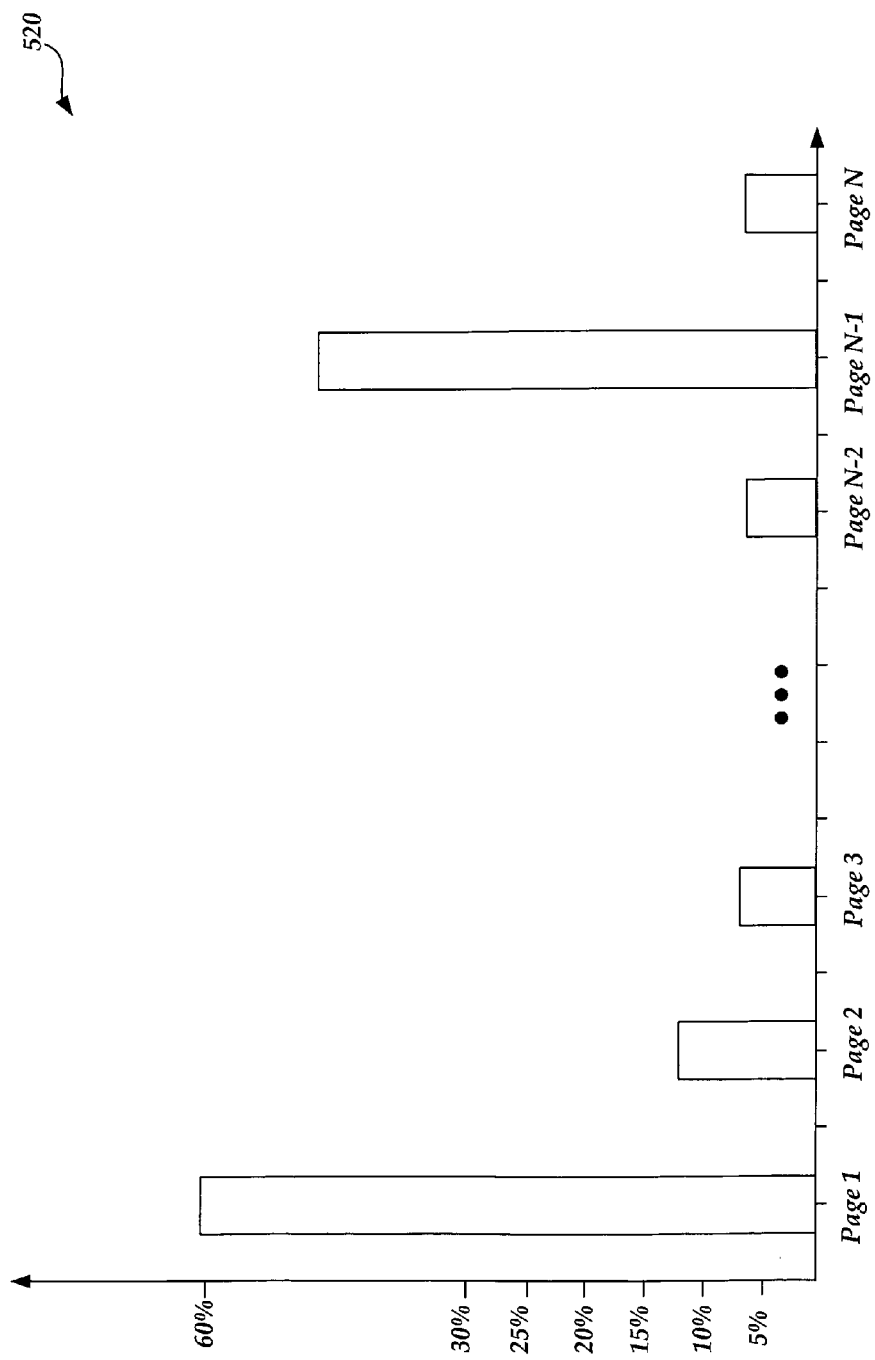

Referring to FIGS. 5A-5B, graphs 500, 510 illustrate digital content access patterns among various users based on aggregated access values. More specifically, in FIGS. 5A-5B, a total value of aggregated access to each chapter of an e-book is shown. In this example, the aggregated access value may represent what percentage of each chapter has been copied. Based on the total value of the aggregated access, chapter thresholds may be assigned. For example, based on the aggregated access, a general threshold of 30% may be assigned to one chapter while the total value of the aggregated access to a popular chapter resulted in a threshold of 60%. For the purpose of discussion, assume that the content service provider 110 has specified that, if the total value of aggregated access to each chapter is close to the general threshold, it may be a suspicious group behavior. As an example, the graph 500 shown in FIG. 5A may be regarded as indicating a suspicious group behavior because all chapters have a similar access behavior. In contrast, the graph 510 shown in FIG. 5B may be regarded as indicating a normal group behavior because interesting, or more popular chapters are accessed or copied more frequently than others.

Referring back to FIG. 3C, the user 342 may send a copy/paste request to the server 310 by selecting a portion from the interactive image page. The user 342 can select a portion from the interactive image page by highlighting the portion by the user input device including, but not limited to, a mouse, a digital pen, a keyboard, a touch screen, or the like. The information related to the selected portion, such as information relevant to locate the selected portion from the image and the text data store 314, may be provided to the server 310. An example of such information includes, but is not limited to, X-Y screen coordination of a start and an end of the selected portion within the interactive image page, information about the interactive image page, or the like.

After the information about the selected portion is provided to the server, the corresponding text portion may be identified. If necessary, the server 310 will verify the user access right to the identified text portion. As will be described in greater detail below, several thresholds can be utilized for such verification. For example, a text portion threshold (to limit the total amount of the text portion accessed by a user or a group of users), a image page threshold (to limit the total amount of the page accessed by a user or a group of users), a content threshold (to limit the total amount of the content accessed by a group of users), a user threshold (to limit total amount of the digital content accessed by a user), or the like may be specified. The server 310 will use all or some of these thresholds to verify whether the user 342 has a right to access the identified text portion.

Upon verification, the server 310 retrieves the identified text portion from the text data store 314. Subsequently, the retrieved text portion is provided to the user 342, which can be re-used, copied or printed. After providing the identified text portion, the server 310 updates the user and content profile data store 316 to reflect that the identified text portion has been provided to the user 342.

Figure 4A:
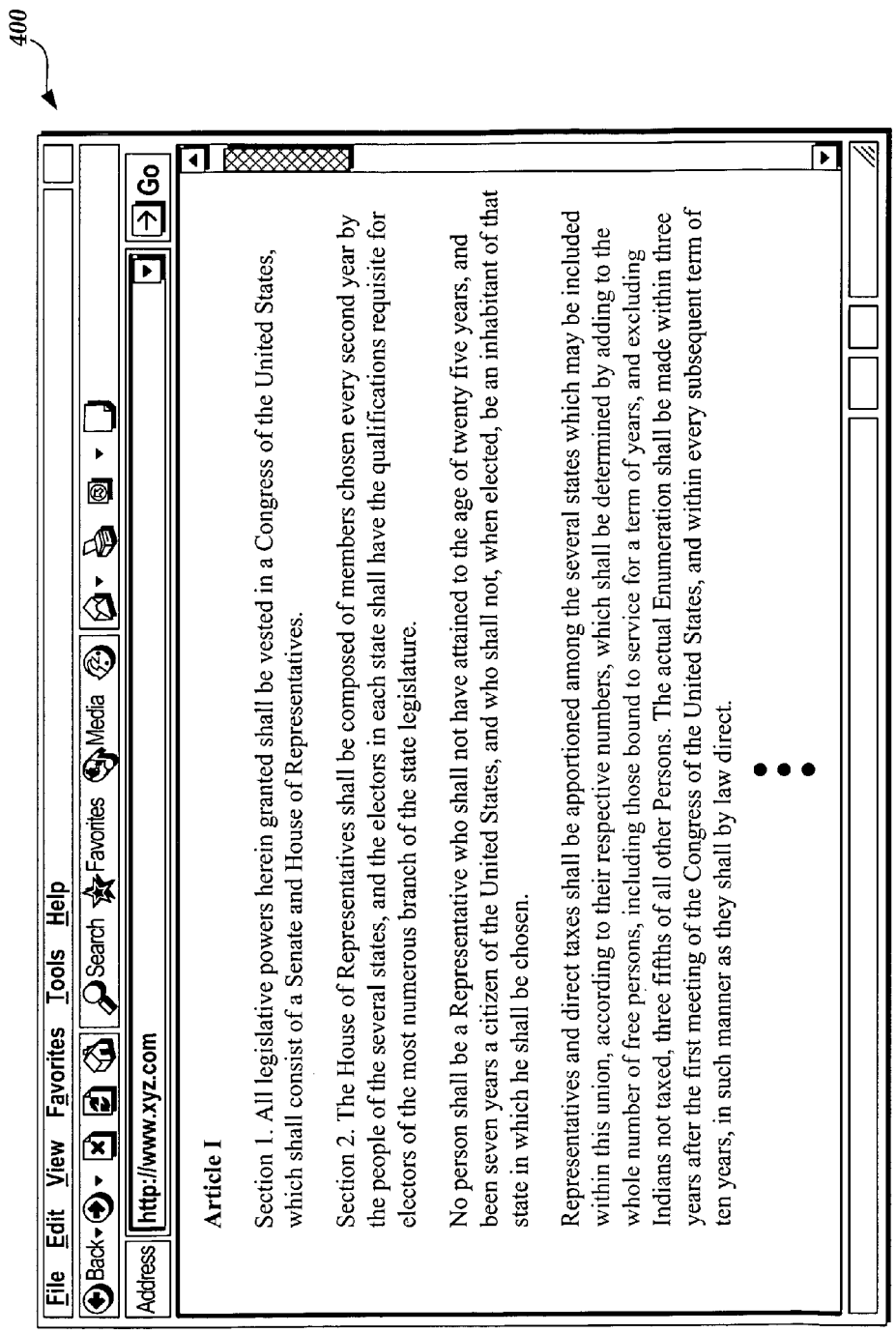
FIGS. 4A-4C are screen displays showing an interactive image document that enables a user to obtain a text portion of an image page in accordance with an embodiment of the present invention.
Figure 4B:
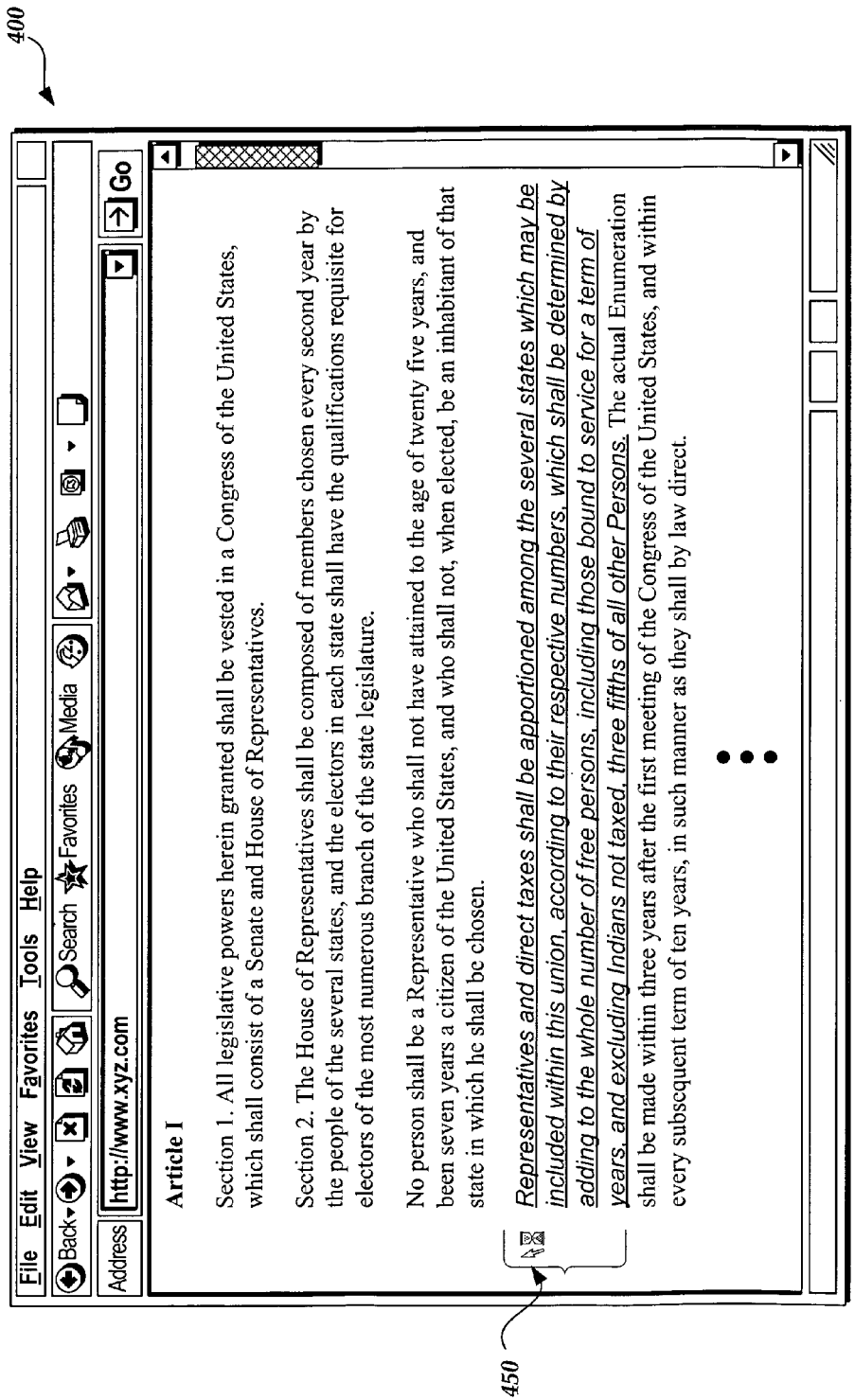
Figure 4C:
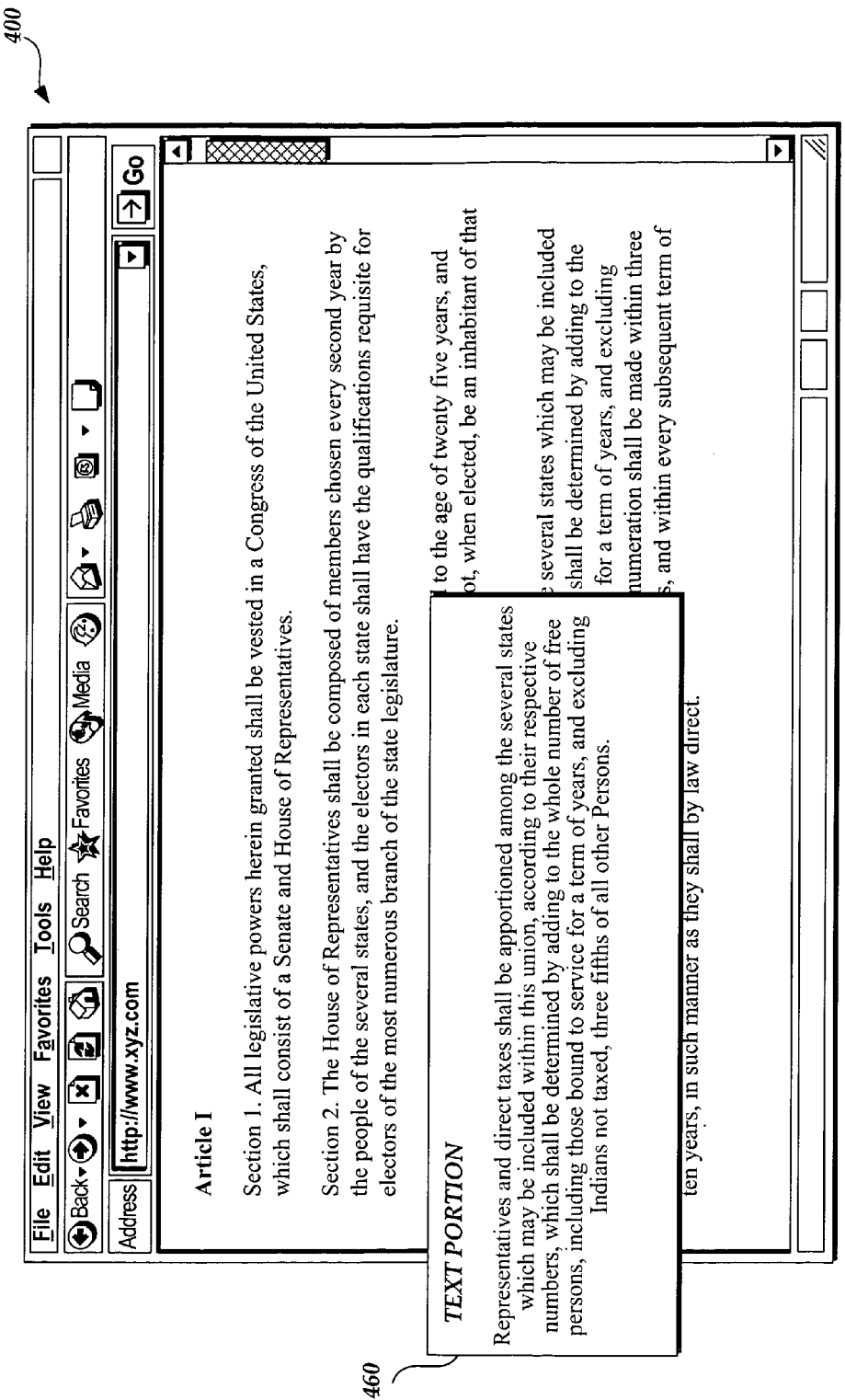

FIGS. 4A-4C are exemplary screen displays 400 showing an interactive image page where a user can interact to obtain a text portion of a image page in accordance with an embodiment of the present invention. For the purpose of discussion, assume that a user is viewing digital images of the "U.S. CONSTITUTION" provided by the content provider server 110. Within the exemplary screen display 400, an interactive image page corresponding to a portion of "ARTICLE I" is presented to the user. In an aspect of the present invention, the displayed image does not contain any text information in order to protect the content from unauthorized copying. However, the user can select a portion from the displayed image as shown in FIG. 4B. The selected portion 450 may be visually distinguished from the rest of the displayed image. For example, the selected portion can be highlighted, underlined, displayed in different color or font, etc. After the selection, the user may request to obtain a text portion from the server. In one embodiment, a certain key combination may be used to indicate a request to copy, paste, or print the selected portion. In addition, a menu to select a copy, paste, or print request may be provided within the exemplary screen display 400. The information related to the selected portion, such as information relevant to locate the selected portion from the image and the text data store may be provided to the content provider server 110. Subsequently, the content provider server 110 will identify the text portion based on the information. After proper verification, the content provider server 110 provides the text portion 460 to the user as illustrated in FIG. 4C. The user can manipulate the text portion 460 for copying, pasting and printing.

Figure 6:
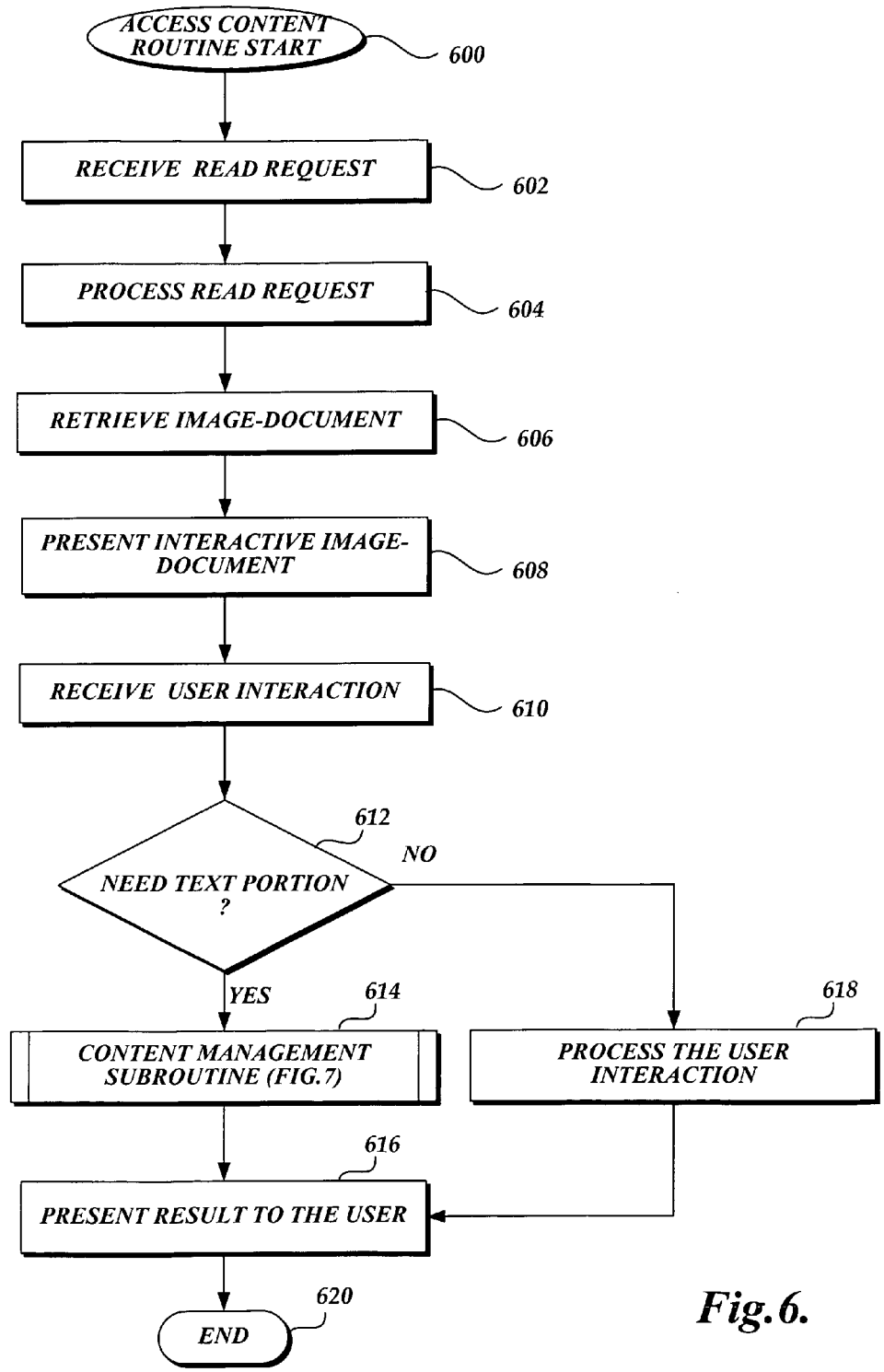
FIG. 6 is a flow diagram of an access content routine in accordance with an embodiment of the present invention.

Referring to FIG. 6, a flow diagram 600 illustrates an access content routine for providing an image portion or a text portion of a digital content to a user in accordance with an embodiment of the present invention. Beginning with block 602, the content provider server 110 receives a user request to view digital content. At block 604, the user request may be processed to identify which image page of the digital content is requested. Upon receipt of the user request, the content provider server 110 may also verify the user request with respect to the digital content. As discussed above, the content provider server 110 may obtain information about the digital content, such as content profile information, a content threshold, any rules related to the digital content, etc., to verify the user request. Likewise, information about the user may be also obtained to verify the user request. In some instances, a certain portion of the digital content is prohibited from being offered to a certain group of users to view. In such a case, only the allowed portion will be retrieved and presented to the user.

At block 606, an image portion of the digital content is identified based on the processed user request and the identified image portion is retrieved from the image data store 222. Subsequently, the content provider server 110 presents an interactive image page representing the image portion to the user within a display window (e.g., a Web browser window). At block 610, user interaction is received via the interactive image page. An example of the user interaction may be a request requiring text portion access, such as a copy/paste request, a print request, etc. As described above, the image portion or the interactive image page is purposefully configured not to contain any text information. Further, the interactive image page does not have a resolution high enough for visually pleasing printing. Thus, the user cannot copy, reproduce or print a part from the interactive image page in sufficient quality unless a text portion of the part is provided by the server. In this manner, the content provider server 110 can control the usage of the digital content while allowing the user to re-use some part of the digital content.

At decision block 612, a determination is made as to whether the received user interaction indicates a text access request, such as copying request, pasting request, printing request, etc., and thus, a text portion needs to be provided to the user. If it is determined at decision block 612 that the received user interaction indicates a text access request, at block 614 a content management subroutine 700 (FIG. 7) returns the corresponding text portion or a notification. If it is determined at decision block 612 that the text portion does not need to be provided to the user, at block 618 the user interaction is processed and implemented. For example, the user interaction may indicate that the user wants to view other portions of the digital content. This user interaction does not require accessing the text portion. While this user interaction is being processed, the server may retrieve the requested image portions of the digital content from the image data store 222. In some instances, the user interaction may not be processed as the user indicated. The content provider server 110 generates a notification to explain why the user interaction has not been processed as the user indicted.

After obtaining the result from the subroutine 700 (at block 614), or processing the user interaction (at block 618), the result (e.g., a text portion, a notification, an image portion, etc.) may be presented to the user at block 616. The routine completes at block 620.

Figure 7:
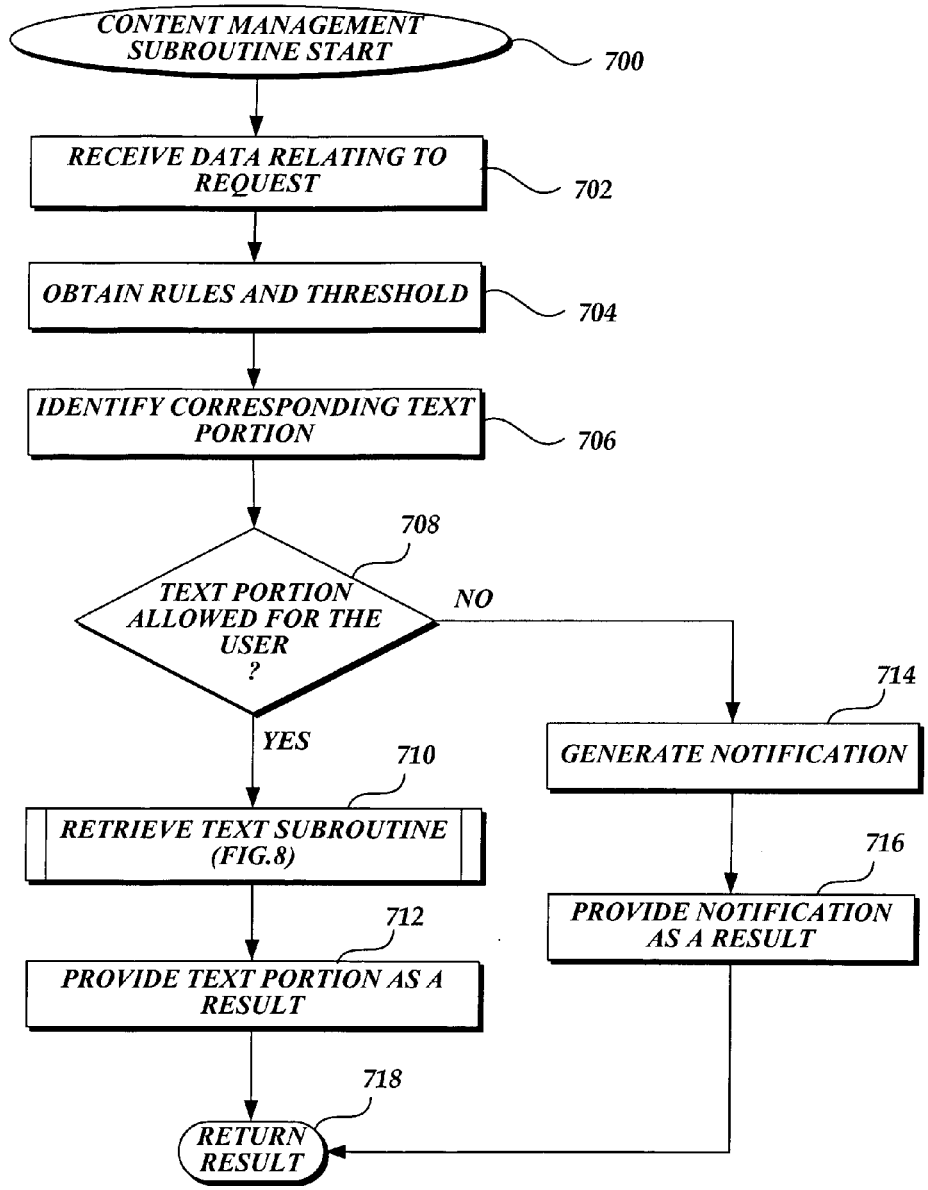
FIG. 7 is a flow diagram of a content management subroutine in accordance with an embodiment of the present invention.

FIG. 7 is a flow diagram of a content management subroutine for identifying and providing a text portion in accordance with an embodiment of the present invention. Beginning at block 702, information relating to a request for a text portion access is received. As with FIG. 6, the user interaction received over the interactive image page may be a request requiring the text portion access, such as a copy request, a paste request, a print request, etc. When the user selects a desired portion from the interactive image page, the content provider server 110 may receive the relevant information including, but not limited to, X-Y coordination of the start and the end position of the selected portion on the interactive image page. In addition, the content provider server 110 may obtain information relating to the interactive image page. Further, the content provider server 110 may obtain rules and thresholds to verify the user's right for the text portion access as illustrated at block 704. At block 706, the corresponding text portion may be identified. At decision block 708, a determination is made as to whether the user has a right to access the identified text portion. If it is determined at decision block 708 that the user is authorized to access the identified textportion, at block 710 a retrieve text subroutine 800 retrieves the identified text and updates user and content profile data store 216. The retrieved text portion may be provided as a result at 712.

If it is determined at decision block 708 that the user is not authorized to access the identified text portion, at block 714 the service provider generates a notification informing the user about the reason of unsuccessful text access. As described above, if the total value of aggregated access to the particular text portion has met its threshold, any access to the text portion may be denied for a predetermined time period. Likewise, if the total value of aggregated access to the particular digital content has met its threshold, an access to any text portion of the digital content may be denied for a predetermined time. As described above, some access patterns may be monitored and detected as suspicious based on the aggregated access information.

When a requested access is denied, a notification may be generated, explaining why the access is denied for a time being and when the access can be resumed. If the amount of total copy of the content by a single user has met its threshold (% of the digital content has been copied, accessed, etc.), the user is not able to access any more portions of the digital content. In this situation, a notification informing the user about the reason of unsuccessful text access may be generated. At block 716, the generated notification is provided as a result. The routine 700 returns the result from block 712 or block 716 and completes at block 718.

Figure 8:
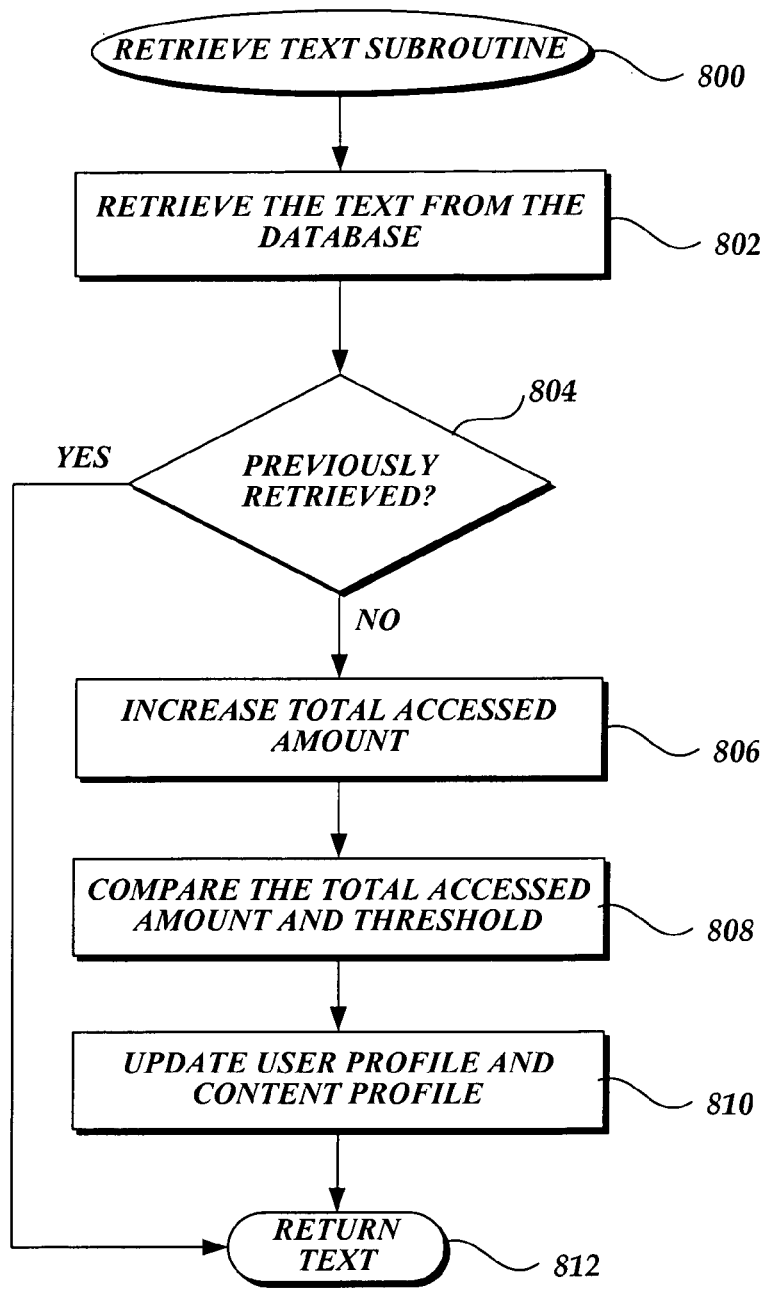
FIG. 8 is a flow diagram of a text retrieving subroutine utilized in FIG. 7 in accordance with an embodiment of the present invention.

FIG. 8 is a flow diagram 800 of retrieve text subroutine for retrieving a text portion and updating the user and content profile data store 216 in accordance with an embodiment of the present invention. Beginning at block 802, the identified text may be retrieved from the text data store 214. At decision block 804, a determination is made as to whether the identified text has been previously retrieved for the particular user. If it is determined that the text portion has not been previously retrieved for the particular user, at block 806, the total access amount may be increased by the size of the text portion. The total access amount (total aggregated access information) may be compared with the threshold at block 808. At block 810, the user and content profile data store 216 will be updated based on the total access amount. For example, if the total access amount meets or exceeds the threshold, the content profile may be updated to specify a rule indicating that no user can access a text portion of the content for a predetermined period. If it is determined at decision block 804 that the text portion has been previously retrieved for the particular user, the routine 800 continues to block 812. After updating (block 810), if it is determined that the text portion has been previously retrieved (decision block 804), the routine 800 returns the retrieved text portion and completes at block 812.

As will be appreciated by one of ordinary skill in the art, the total access amount and its threshold described in conjunction with the routine 800 are described merely as an example. Any information relating to control, monitor, manage user accesses to the digital content may be updated (or aggregated by the retrieved text portion) and compared with its corresponding threshold. The user and content profile information will be updated to reflect such information.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer system for providing an interactive image document through which a user accesses text data of a digital content, the computer system comprising:

an image data store comprising image data of the digital content;

a text data store comprising text data corresponding to the image data stored in the image data store, wherein a given portion of text data stored in the text data store represents information in a corresponding portion of image data stored in the image data store; and a computing device in communication with the image data store and the text data store, the computing device operative to:

provide an interactive image page, the interactive image page including image data retrieved from the image data store, wherein information represented in the image data of the interactive image page cannot be manipulated by a user;

receive a selection of a portion of the image data of the interactive image page, the selection indicating that an access to text data representing information in the selected portion of the image data of the digital content is desired, wherein the received selection comprises a start location and an end location of the selected portion within the image data;

obtain verification information related to the access to the text data;

verify whether the user has a right to obtain a text portion corresponding to the selected portion of the image data of the digital content, wherein the text portion represents information in the corresponding image portion; and upon verification, retrieve from the text data store the text portion, wherein the text portion comprises text data representing information in the selected portion of the image data; and provide the retrieved text portion to the user, wherein the provided text portion can be manipulated by the user.

2. The computer system of claim 1, wherein the interactive image page enables the user to input a request to obtain the text portion of the digital content corresponding to a portion of the interactive image page.

3. The computer system of claim 2, wherein the request is at least one of a copy request or print request.

4. The computer system of claim 1 further comprising:
a user and content profile data store including the verification information.

5. The computer system of claim 4, wherein the verification information includes a plurality of thresholds that are used to verify the request.

6. The computer system of claim 4, wherein the verification information includes a total access amount of the portion of the digital content.

7. The computer system of claim 4, wherein the verification information includes a total access amount of the text portion.

8. The computer system of claim 7, wherein the total access amount of the text portion and a content threshold are compared and, if the total access amount of the text portion exceeds the content threshold, the verification is denied.

9. The computer system of claim 8, wherein if the verification is denied, a user notification is generated.

10. The computer system of claim 6, wherein the total access amount of the text portion is updated after providing the retrieved text portion, the total access amount information being included in the user and content profile data store.

11. The computer system of claim 10, wherein the total access amount of the text portion is not updated if the user has previously accessed the text portion.

12. The computer system of claim 11, wherein the text portion from the text data store is provided without verification if the user has previously accessed the text portion.

13. The computer system of claim 1, wherein before presenting the interactive image page, a user request to access a portion of the digital content is received, the request to access the portion of the digital content is processed and the image portion from the image data store is identified.

14. The computer system of claim 12, wherein the text portion in the text data store has a format that enables the user to perform at least one of copying or printing the text portion.

15. The computer system of claim 1, wherein the user interaction includes selecting a portion of the interactive image page via at least one of a user input device or a touch screen.

16. The computer system of claim 1, wherein the user interaction includes highlighting a portion of the interactive image page.

17. A computer-implemented method for obtaining text data via an interactive image page, the method comprising:

as implemented by one or more computing devices configured with specific executable instructions, receiving a user request to access an image document;

providing an interactive image page including image data of the image document, wherein information represented in the image data of the interactive image page cannot be manipulated by a user, the interactive image page being suitable for receiving user interaction;

receiving a user selection of a portion of the image data of the interactive image page, the selection indicating that copying text data representing information in the selected portion of the image data of the interactive image page is desired, wherein the received selection comprises a start location and an end location of the selected portion within the image data; and in response to the user selection, retrieving from a data store a text portion, wherein the text portion comprises text data representing information in the selected portion of the image data; and providing the text portion after verifying the user selection, wherein the text portion can be manipulated by the user.

18. The computer-implemented method of claim 17, wherein receiving the user selection includes detecting a selected portion of the interactive image page.

19. The computer-implemented method of claim 18 further comprising:
identifying text portion corresponding to the selected portion.

20. The computer-implemented method of claim 19, wherein identifying the text portion includes identifying an image portion corresponding to the selected portion, the image portion being stored in an image data store.

21. The computer-implemented method of claim 20, further comprising:
obtaining the text data from a text data store based on the identified image portion, wherein the text data store is related to the image data store.

22. The computer-implemented method of claim 21 further comprising:
verifying whether the user has a right to access the text portion.

23. The computer-implemented method of claim 22 further comprising:
obtaining rules and a threshold with respect to the interactive image page for verifying the user access;
wherein the rules and the threshold are defined in a content profile relating to the image document and a user profile relating to the user.

24. The computer-implemented method of claim 23 further comprising:
after providing the text portion, updating the content profile relating to the image document and the user profile.

25. The computer-implemented method of claim 22 further comprising:
if it is verified that the user does not have a right to access the text portion, disabling the user from selecting the portion on the interactive image page.

26. An interactive image document system for enabling a user to access a portion of a digital content, the interactive image document system comprising:
a data store component for storing image portions of the digital content and text portions of the digital content;
wherein each image portion of the digital content has a text portion that represents information in the corresponding image portion stored in the data store component;
a user interface component for receiving a selection of an image portion from the interactive image document, wherein information represented in the image portion cannot be manipulated by a user, wherein the received selection comprises a start location and an end location of the selected image portion;

a content management component for identifying the text portion which corresponds to the selected image portion and for obtaining the text portion from the data store component, wherein the text portion comprises text data representing information in the selected image portion; and wherein the user interface component provides the obtained text portion to the user, wherein the text portion provided to the user can be manipulated by the user.

27. The interactive image document system of claim 26, wherein the selected image portion is visually distinguished.

28. The interactive image document system of claim 26, wherein the user interface component enables the user to re-use the text portion.

29. The interactive image document system of claim 28, wherein the user interface component enables the user to print the text portion.

30. The interactive image document system of claim 26, wherein before obtaining the text portion, the content management component verifies whether the user has an access right to the text portion.

31. The interactive image document system of claim 30, wherein the content management component uses a content threshold to verify whether the user has an access right to the text portion.

32. The interactive image document system of claim 30, wherein the content management component uses a user threshold to verify whether the user has an access right to the text portion.

* * * * *